March 31, 1931.   H. B. CHALMERS   1,798,723
POWER TRANSMISSION APPARATUS
Filed April 2, 1925   2 Sheets-Sheet 1

Inventor
Henry B. Chalmers
By his Attorney

March 31, 1931. H. B. CHALMERS 1,798,723
POWER TRANSMISSION APPARATUS
Filed April 2, 1925 2 Sheets-Sheet 2
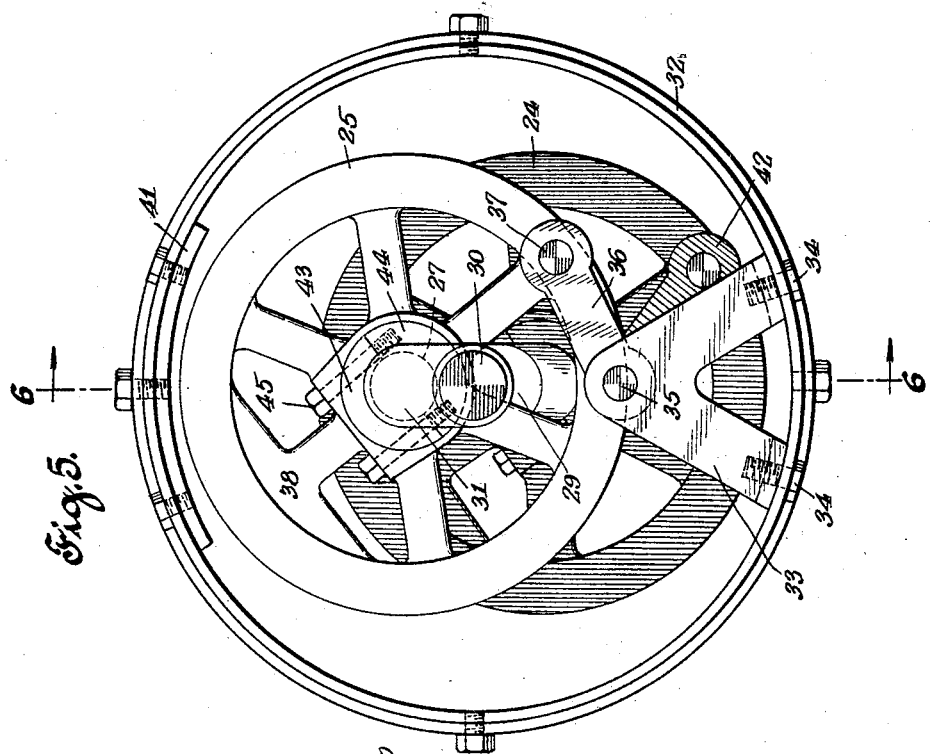
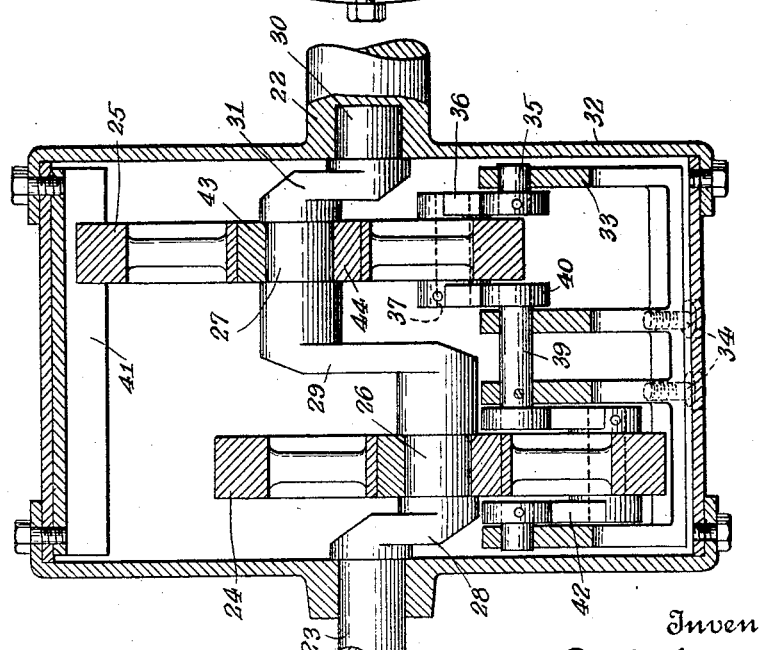
Inventor
Henry B. Chalmers
By his Attorney Patented Mar. 31, 1931

1,798,723

UNITED STATES PATENT OFFICE

HENRY B. CHALMERS, OF NEW YORK, N. Y.

POWER-TRANSMISSION APPARATUS

Application filed April 2, 1925. Serial No. 20,147.

The main object of my invention is to vary the transmitted speed inversely with the load. In general it is also useful whenever the driven member is to carry a variable load or the driving member is a variable power, as a windmill. It is applicable to many uses, such as the driving or punching and shearing presses, lathes and other machine tools, as well as for the driving of motor vehicles. It is also very useful for utilizing a constant speed A. C. motor for a variable load.

It has been proposed to utilize the inertia of oscillating masses connected between driving and driven members, but the unbalanced force of vibration incident to such oscillation render such devices highly objectionable. I propose, on the contrary, to utilize the well-known principle of inertia of an ordinary rotating fly wheel but differentially mounted between the driving and driven members so that it may simultaneously absorb power from one member and give up power to the other.

Ordinarily, of course, the fly wheel can not be both absorbing and delivering power at the same instant, but by mounting it differentially with respect to the driving and driven members we are able to vary its velocity at definite rates inversely with the velocity of said members so that the transmitted speed varies inversely with the load.

Figs. 5 and 6 are end and side views, respectively, showing parts in section of a more fully developed form of apparatus embodying the invention, the parts being substantially balanced as to acceleration and retardation and balanced as to gravity and centrifugal force.

Figure 1:
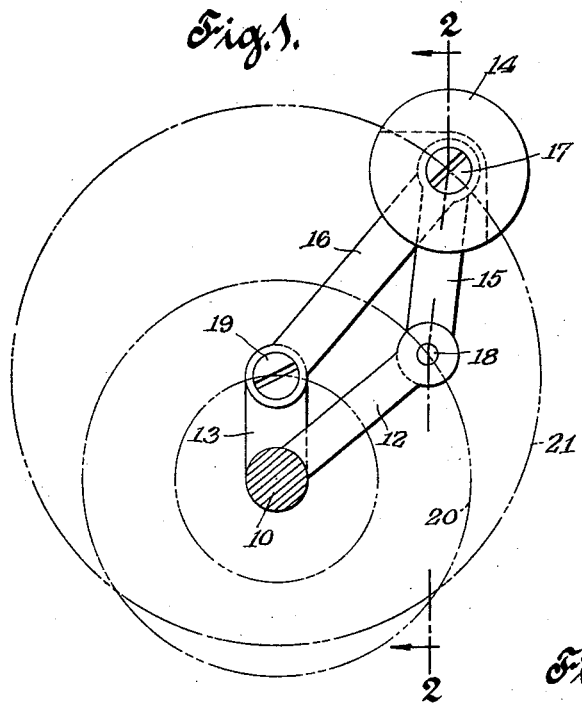
Fig. 1 shows in section and end elevation the elements of a simple apparatus illustrating the principle of the invention.
Figure 2:
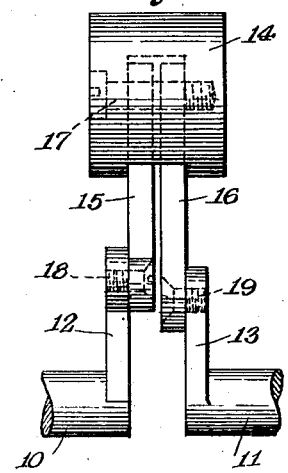
Fig. 2 is a side view of the same.
Figure 3:
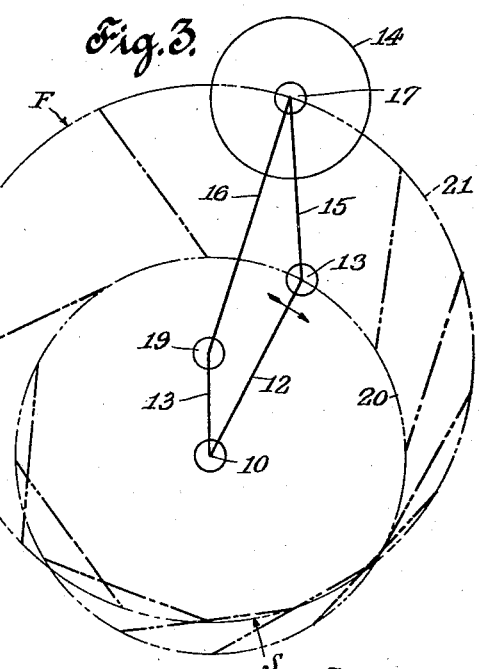
Fig. 3 is a purely diagrammatic view illustrating the relative movements of the elements of the mechanism shown in Figs. 1 and 2.

The construction and mode of operation of the apparatus in Figs. 5 and 6 will be more readily understood from a study of the parts illustrated in Figs. 1 and 2 and in the diagram of Fig. 3. In Figs. 1 and 2, 10 and 11 represent the driving and driven members, respectively. Power is applied to the shaft member 10 and the work is performed by or from the shaft 11. It will be understood, of course, that the members 10 and 11 are supported in suitable bearings. The driving member 10 is provided with a crank arm 12 adapted to rotate with it. The driven member 11 also has a crank arm 13 which serves to rotate it. The inertia mass 14 is connected to the crank arms 12 and 13 by links 15 and 16, respectively, in such a manner as to permit the two cranks 12 and 13 to rotate together or independently. In this particular instance the links 15 and 16 are both shown as connected to the bearing pin 17.

If we consider the driven shaft 11 and its crank arm 13 as stationary and rotate the driving shaft 10 and its crank arm 12 in a clockwise direction, it will be seen that the arm 12 in its rotation will carry with it the inner end of the link 15 and thus compel the mass 14 to travel in the arc of a circle about the inner end of the crank 16. If we consider the angular velocity of the crank 12 to be constant, as it would be with a constantly applied force, then it will be obvious that the angular velocity of the mass 14 about the pin 19 must necessarily be variable. In Fig. 3 I have shown a dot-and-dash circle 20 as representing the path of the center of the connecting pin 18 as it travels around the center of the shaft 10, and I have shown by dot-and-dash lines the path 21 of the center of the pin 17 which is the approximate center of the mass 14. The circle 20 is divided into equal parts representing equal periods of time in the constant angular speed of the shaft 10. The length of the cranks and links being fixed, it will be seen that the pin 17 necessarily travels at a variable speed which, from the position shown in Fig. 3, decreases from the position shown as the parts rotate clockwise until it gets to the point "S" near the bottom of the figure, at which its angular velocity about the center 19 is the minimum. From this point on, as the mass continues to rotate around the center 19, the angular velocity increases until it reaches the point "F" at which its angular velocity is the maximum. As the mass passes from the point "F" at its maximum speed right-handed toward the point "S", it is being retarded or decelerated and places the link 15 in compression. When the mass 14 passes the point "S" traveling right-handed, power is applied to it through the link 15, which is now in tension, while the mass 14 is being accelerated toward the point "F". It will be noted that during the acceleration of the mass, its resistance to such acceleration tends to pull the link 15 in a counter-clockwise direction around the instantaneous center, namely, pin 18, and therefore the resultant of this pull is a compression in the link 16 and a pressure on the pin 19 in a clockwise direction producing a torque on the driven member. On the other hand, when the mass 14 is being retarded, its tendency to continue at the same velocity puts the link 15 in compression and tends to rotate it about the instantaneous center, namely, the pin 18, thus putting link 16 into tension and producing a torque on driven shaft 11. It will be noted that this torque on a driven shaft 11 is always in the direction that the driving shaft 10 is moved, except for a very small portion of the travel of the mass between "F" and the points on its path crossed by a plane through 10, 11, and 19, but this reversal of pull is very slight owing to the fact that the velocity of the mass is nearly constant close to the point "F". The same condition exists adjacent the slowest point "S". This condition is dependent upon the relative dimensions of the links and cranks.

Figure 4:
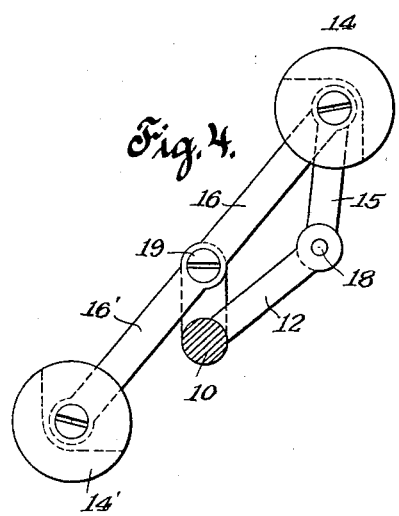
Fig. 4 is a view similar to Fig. 1 of a partially balanced mechanism.

It will be observed in Figs. 1 and 2 as shown in the elementary form of the invention, that the gravitational force as well as the centrifugal force, operate here to cause vibration trouble. Both these causes can be eliminated by continuing the link 16 in the opposite direction an equal distance, as shown in Fig. 4, and mounting on its end a weight 14' to balance the weight 14 plus a portion of the weight of the link 15. It will be observed that an improved form of the invention would be to enlarge the weights 14 and 14' by describing them in a circle about 19 as a center to form a fly wheel rim and adding other suitable arms thereto. Two such fly wheels are shown in Figs. 5 and 6. In this form 22 represents the driving member and 23 is the driven member. In this case there are two masses, 24 and 25, in the form of fly wheels mounted on crank bearings 26 and 27 which are formed as parts of or connected to the shaft 23. The arm 28 in this case corresponds with the arm 13 in Fig. 1, and similarly the arm 29 constitutes the crank arm for the fly wheel 25 corresponding to the arm 13. For convenience in construction the end 30 of the shaft 23 has a bearing in driving member 22 or concentric with it. The crank pin 27 is connected with the end 30 by a crank arm 31. A casing 32 forms a part of the driving member and contains the fly wheels and the means connecting the fly wheels with the crank shaft 23. A bracket 33 is secured inside this casing in any suitable manner, as for instance, by bolts 34. This bracket has a bearing for the pin 35 on one end of the link 36. The other end of this link 36 is hinged on the pin 37 which projects from the rim of the fly wheel 25. The casing 32 and bracket 33 correspond with the crank arm 12 of Fig. 1, and the pin 35 corresponds with the pin 18. Link 36 corresponds with link 15, and pin 37 corresponds with pin 17. The fly wheel 25 may be provided with a counter-weight 38 to counter-balance the mass of the pin 37 and part of the link 36. It will thus be seen that it is possible to approximately balance the fly wheel 25 and its attached parts with respect to centrifugal force around the axis of the crank pin 27.

To prevent a twisting strain on pins 35 and 37, I preferably provide a pin 39 whose axis is in line with the pin 35 and connected by a link 40 to the pin 37. To counter-balance the weight of the bracket 33 and attached parts, I may provide a weight 41 in the opposite side of the casing 32.

The fly wheel 24, being arranged on an axis 180° away from the axis of the fly wheel 25, counter-balances the local inertia forces set up in the driven member. This fly wheel 24 is connected to the casing through the medium of a bracket 33 and the double connecting links 42. It will be understood, of course, that the casing 32 may be filled with grease or other lubricant and that the bearings shown are merely diagrammatic representations. For the purpose of permitting the fly wheel 25 to be applied or removed, I may form the bearing on the pin 27 of parts 43 and 44 held together by bolts 45 which pass through the hub of the fly wheel. By loosening the bolts 45, the fly wheel may be slipped along the crank shaft sufficiently to release the bearings 43 and 44 and permit them to be removed.

I claim:

1. Power transmission mechanism comprising a casing, a shaft, revoluble with respect to said casing and having oppositely disposed offset bearings, a fly wheel mounted on each of said bearings and means of connection between the said fly wheels and said casing comprising connected arms pivotally supported by said casing and connected respectively to said fly wheels.

2. A driving member and a driven member, a crank connected to and rotatable with each member and a two-part hinged member connecting the two cranks, said two-part hinged member including a plurality of completely rotatable flywheels.

3. Power transmission mechanism comprising driving and driven members, said driven member having offset cranks, fly wheels revolubly mounted on said cranks, a bracket revolubly carried by said driving member eccentric to the axis thereof, and oppositely disposed offset cranks supported in said bracket and connected to said fly wheels respectively.

HENRY B. CHALMERS.